United States Patent
Kasubuchi (10) Patent No.: US 7,430,544 B2
(45) Date of Patent: Sep. 30, 2008

(54) OUTPUT IMAGE GENERATING OPERATION SERVICE USING NETWORK

(75) Inventor: Kiyotaka Kasubuchi, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 888 days.

(21) Appl. No.: 10/796,046

(22) Filed: Mar. 10, 2004

(65) Prior Publication Data

US 2004/0230641 A1 Nov. 18, 2004

(30) Foreign Application Priority Data

May 13, 2003 (JP) ............... 2003-134120

(51) Int. Cl.
*G06Q 99/00* (2006.01)
(52) U.S. Cl. ............... 705/400; 705/1; 705/10; 705/34; 705/35; 358/1.13; 718/103
(58) Field of Classification Search ......... 705/1, 705/400, 8, 10; 358/1.13; 718/103
See application file for complete search history.

(56) References Cited

U.S. PATENT DOCUMENTS

| 5,367,673 | A | | 11/1994 | Goldsmith et al. |
| 5,897,260 | A | * | 4/1999 | Zingher ............... 400/719 |
| 6,252,681 | B1 | * | 6/2001 | Gusmano et al. ......... 358/468 |
| 6,724,492 | B1 | * | 4/2004 | Iwase et al. .............. 358/1.13 |

| 2003/0078863 | A1 | * | 4/2003 | Pilu .................... 705/34 |
| 2004/0027602 | A1 | * | 2/2004 | Kuboki ................. 358/1.13 |
| 2004/0179223 | A1 | * | 9/2004 | Iwase et al. ............. 358/1.13 |

FOREIGN PATENT DOCUMENTS

| JP | 2002183531 A | * | 6/2002 |
| JP | 2003-076509 A | | 3/2003 |

OTHER PUBLICATIONS

"PhotoWorks Archive Crosses the 85 Million Image Mark; The World's Largest Consumer Photo Storage Site Continues to Expand With Film And Digital Photos", Mar. 16, 2000, Businesswire.*
Snell, Jason, "Turn pixels into prints: We put 12 online photo services and 5 photo printers to the test", Jun. 2002, Macworld, 19, 6, 71(8).*

* cited by examiner

*Primary Examiner*—John W Hayes
*Assistant Examiner*—Freda A. Nelson
(74) *Attorney, Agent, or Firm*—McDermott Will & Emery LLP (57) ABSTRACT

A paid operation queue Q1 and a trial operation queue Q2 are provided within an output operation execution system. Each request for execution of an operation job from a client device is entered into either the paid operation queue Q1 or the trial operation queue Q2. An operation job is selected and executed to generate image output data. A paid operation job is selected in precedence to a trial operation job. The image output data thus obtained is temporarily stored into a storage device. If the executed operation job is a paid operation job, the image output data is transferred to the client device without undesired modification, and if the executed operation job is a trial operation job, the image output data is added with a trial-job mark and then is transferred to the client device.

8 Claims, 6 Drawing Sheets

PAID OUTPUT IMAGE

Fig.4 (B)

TRIAL OUTPUT IMAGE

OUTPUT IMAGE GENERATING OPERATION SERVICE USING NETWORK

BACKGROUND OF THE INVENTION

1. Field of the Invention

The present invention relates to a technique of providing output image generating operation services over a network.

2. Description of the Related Art

In commercial printing, image output data that represents a high quality print image is typically generated by carrying out an output image generating operation on its original data. The output image generating operation includes various types of prepress processing such as trapping and RIP to generate high-resolution image-output data from low-resolution original data. In this specification, the output image generation operation may be also referred to as "output operation." The output operation using high grade fonts and halftone dots will produce a high quality print which is hardly obtainable from personal printing.

Such operation requires an expensive output operation device, and thus a higher cost. For this reason, a technique for simply and easily carrying out the output image generating operation has been desired in the art. One example of such technique over a network is disclosed in JP 2003-76509A.

In the output image generating operation over a network, most clients prefer to carry out operations on trial basis and check for qualities or results of the operations prior to their actual use of the result to create printed materials. However, access to the output image generating operation service is generally restricted for commercial reasons and is difficult to be open to the public seeking trial use. Even if trial use is possible, there is still a problem that the operations for authorized clients may be delayed due to increase in requests for trial use.

SUMMARY OF THE INVENTION

In one aspect of the present invention, there is provided a method of executing an output image generating operation job requested from a client device in an output operation execution system that is connected with the client device via a network. The method includes the steps of (a) providing within the output operation execution system a paid operation queue for registering orders of paid operation jobs and a trial operation queue for registering orders of charge-free trial operation jobs; (b) receiving from the client device a request for execution of either a paid operation job or a trial operation job; (c) entering the requested operation job into either the paid operation queue or the trial operation queue; (d) selecting an operation job to be executed while giving priority to the paid operation jobs in the paid operation queue over the trial operation jobs in the trial operation queue; (e) generating image output data by executing the selected operation job, and storing the image output data into a storage device of the output operation execution system; (f) if the executed operation job is a paid operation job, the output operation execution system transferring the image output data to the client device without undesired modification; and (g) if the executed operation job is a trial operation job, the output operation execution system adds to the image output data a trial-job mark indicating that the image output data has been made by trial operation, and transferring the image output data to the client device.

According to this method, a user of the client device can execute an output image generating operation simply and easily by requesting a charge-free trial operation job. Since the paid operation jobs are selected and executed in preference to the trial operation jobs, an inconvenience that the paid operation jobs are excessively delayed due to the trial operation jobs can be prevented.

The present invention may be embodied in various forms, such as a method of executing output operation jobs and a method of managing output operation jobs, a system for output operation execution and a system for output operation job management, a network system including such execution and management systems and client devices, a computer program for implementing functions of such system for output operation execution or of such client devices, a recording medium storing such computer program.

These and other objects, features, aspects, and advantages of the present invention will become more apparent from the following detailed description of the preferred embodiments with the accompanying drawings.

DESCRIPTION OF THE PREFERRED EMBODIMENT

Figure 1:
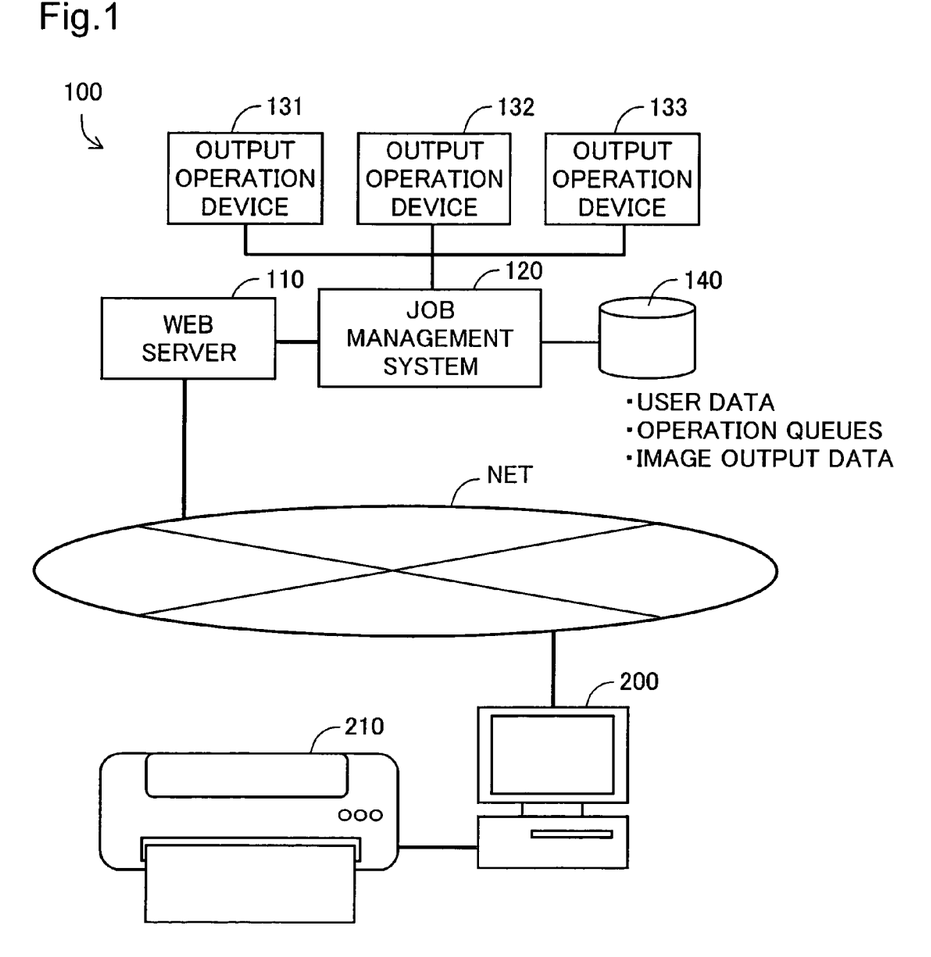
FIG. 1 is a block diagram illustrating a network system according to one embodiment of the present invention.

FIG. 1 is a block diagram illustrating a network system according to one embodiment of the present invention. This network system includes an output operation execution system 100 and a client device 200 that are connected via a network NET such as Internet. The output operation execution system 100 includes a Web server 110, a job management system 120, and output operation devices 131 through 133. The system may be provided with at least one output operation device. The job management system 120 is connected with a storage device 140 that is composed of a hard disk device. The storage device 140 stores data regarding a user of an output operation service, operation queues that will be described later, and image output data.

The client device 200 uses a browser to display a variety of Web pages that are transferred from the Web server 110. Input results by the user on the Web pages are transferred to the output operation execution system 100 via the network NET. A typical personal computer can be used as the client device 200.

The client device 200 is connected with an image recording device 210. The user of the client device 200 can use the image recording device 210 to record images in visible forms based on image output data that are transferred from the output operation execution system 100. A variety of output devices can be used as the image recording device 210, including a plate output machine that makes press plates, a film output machine that makes halftone films, a proof sheet printer that outputs proof sheets, a color printing machine that outputs printed materials directly.

Figure 2:
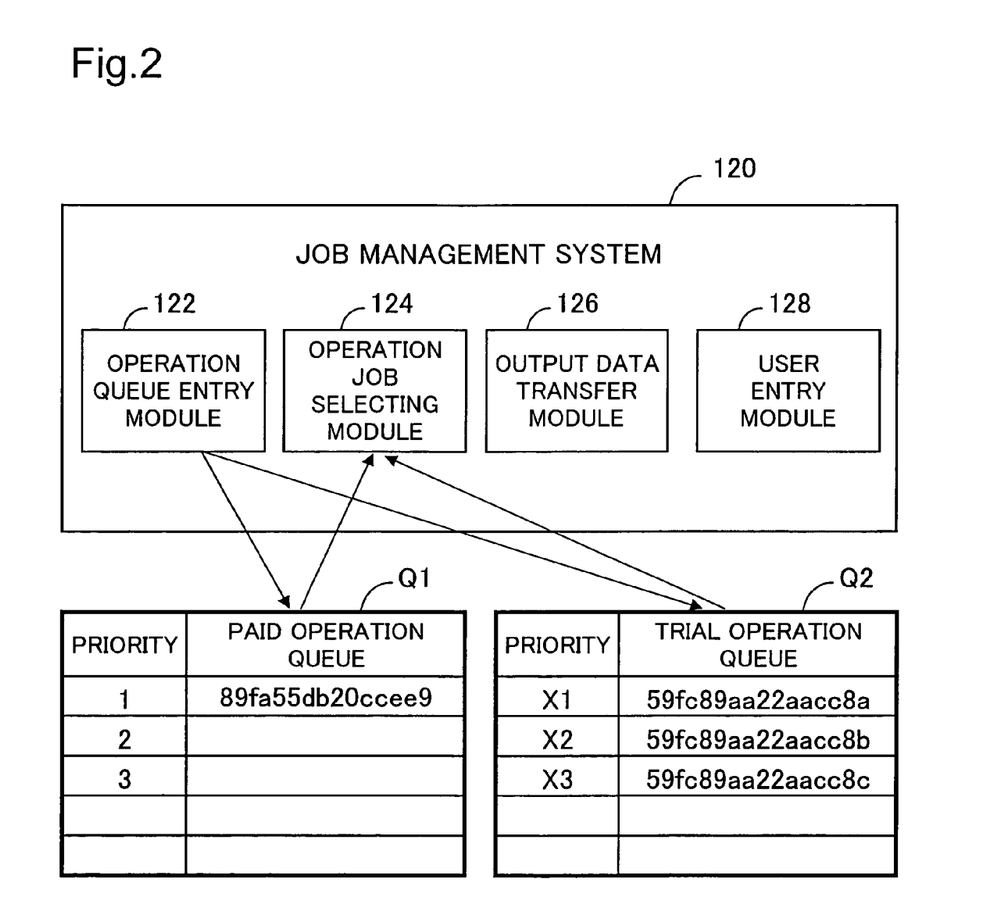
FIG. 2 is a block diagram illustrating a structure of a job management system 120.

FIG. 2 is a block diagram illustrating a structure of the job management system 120. The job management system 120 includes an operation queue entry module 122, an operation job selecting module 124, an output data transfer module 126, and a user entry module 128. The operation queue entry module 122 enters an operation job requested by the client device 200 in either a paid operation queue Q1 or a trial operation queue Q2. The operation job selecting module 124 makes reference to these operation queues Q1, Q2 and selects an operation job that is to be executed by the output operation devices 131 through 133. The output data transfer module 126 stores image output data that have been generated in the output operation devices 131 through 133 into the storage device 140 (FIG. 1), and also transfers the image output data to the client device 200. It should be noted that the output data transfer module 126 can directly connect to the network NET without via the Web server 110 to transfer the image output data to the client device 200. The user entry module 128 enters information regarding trial users (users that request execution of trial operation jobs) or contract users (users that can request execution of paid operation jobs).

Figure 3:
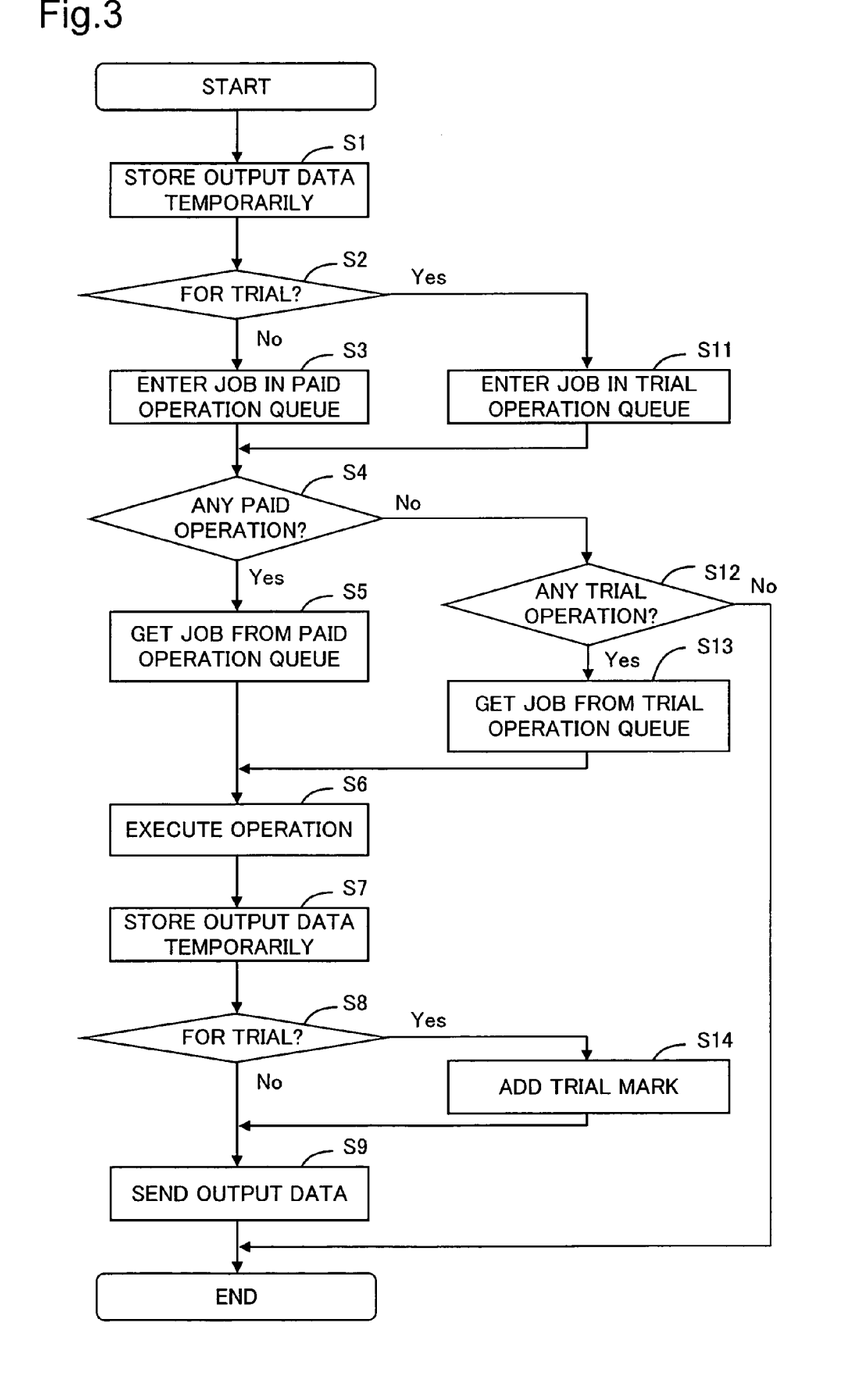
FIG. 3 is a flowchart showing process procedures in the present embodiment.

FIG. 3 is a flowchart showing the procedure of the present embodiment. The operation queue entry module 122 receives an operation request (a request for execution of an operation job) from the client device 200 in step S1. A contract user can request a paid operation job; whereas a trial user (or a non-contract user) can only request a charge-free trial operation job.

The request for operation job, for example, includes the following information:

(1) a title of the operation job and/or a job ID;
(2) original data representing images or characters of original;
(3) various settings of output image generating operation process (parameters for each prepress process such as a trapping process and a RIP process and a format of image output data); and
(4) user information.

The operation queue entry module 122 determines whether the operation job is trial or paid in step S2, and enters the job into the corresponding operation queue Q1 or Q2 in step S3 or S11. The operation job selecting module 124 selects a job to be executed out of the two operation queues Q1, Q2 in steps S5, S12, and S13. The paid operation queue Q1 only has paid operation jobs, which are arranged in an order of descending priorities; whereas the trial based operation queue Q2 only has charge-free trial operation jobs, which are also arranged in an order of descending priorities. In the present embodiment, the order of priority in each operation queue is set according to the order of entry. Furthermore, the order of priority of the paid operation jobs is always set higher than that of the trial operation jobs. Accordingly, a paid operation job in the paid operation queue Q1 is selected in step S4, S5, even if a trial operation job that was entered much earlier still remains in the charge-free operation queue Q2. On the other hand, if the paid operation queue Q1 has no remaining jobs and the trial operation queue Q2 has one or more jobs, the trial operation jobs are selected in the order of descending priorities in step S12, S13. Since the paid operation jobs are selected in preference to the trial operation jobs in the present embodiment as described above, there is advantageously no possibility that execution of the paid operation job that has been requested by the contract user may be delayed due to the trial jobs. The operation job selecting module 124 causes one of the output operation devices 131 through 133 to execute the operation job thus selected. The output operation process at least includes RIP (Raster Image Processing), which is a process of generating image output data that is used to output a print image in a visible form, such as a printed material and a printing plate.

Figure 4A:
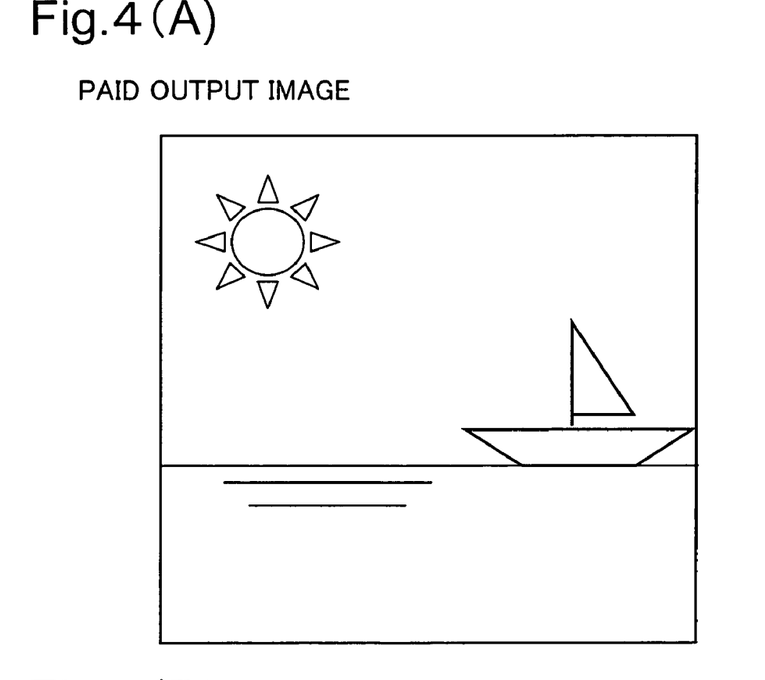
FIGS. 4(A) and 4(B) schematically show an image that is obtained from a paid operation job and an image that is obtained from a trial operation job.
Figure 4B:
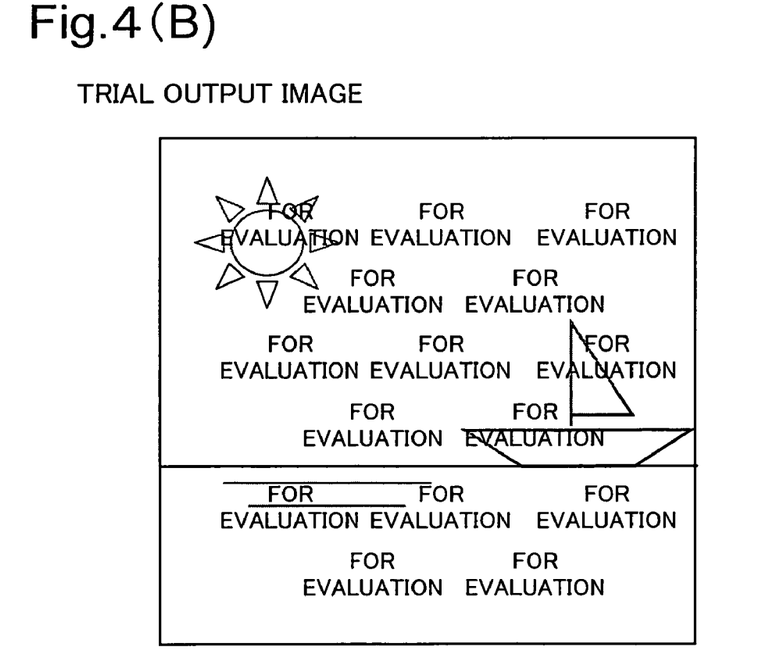

Once informed of termination of the operation from the output operation device, the output data transfer module 126 temporally stores the image output data thus generated into the storage device 140 in step S7. As for a paid operation job, the image output data is transmitted in step S9 to the client device 200 as it is, that is, without undesired modification to the image output data. As for a trial operation job, the image output data is added with a trial-job mark and is transmitted to the client device 200 in step S14, S9. FIG. 4(A) illustrates an example of an image that is represented by the image output data, which is the result of the paid operation job; whereas FIG. 4(B) illustrates the same image that is added with the trial-job mark. This trial-job mark represents characters "FOR EVALUATION" overwritten on the almost entire image. The trial user is provided with the image output data that is attached with such trial-job marks. Since the output image for trial use has the same quality as the image that can be obtained from the paid operation job, except for the trial-job marks, the user can check the quality of the service that is provided by the output operation execution system 100.

Figure 5:
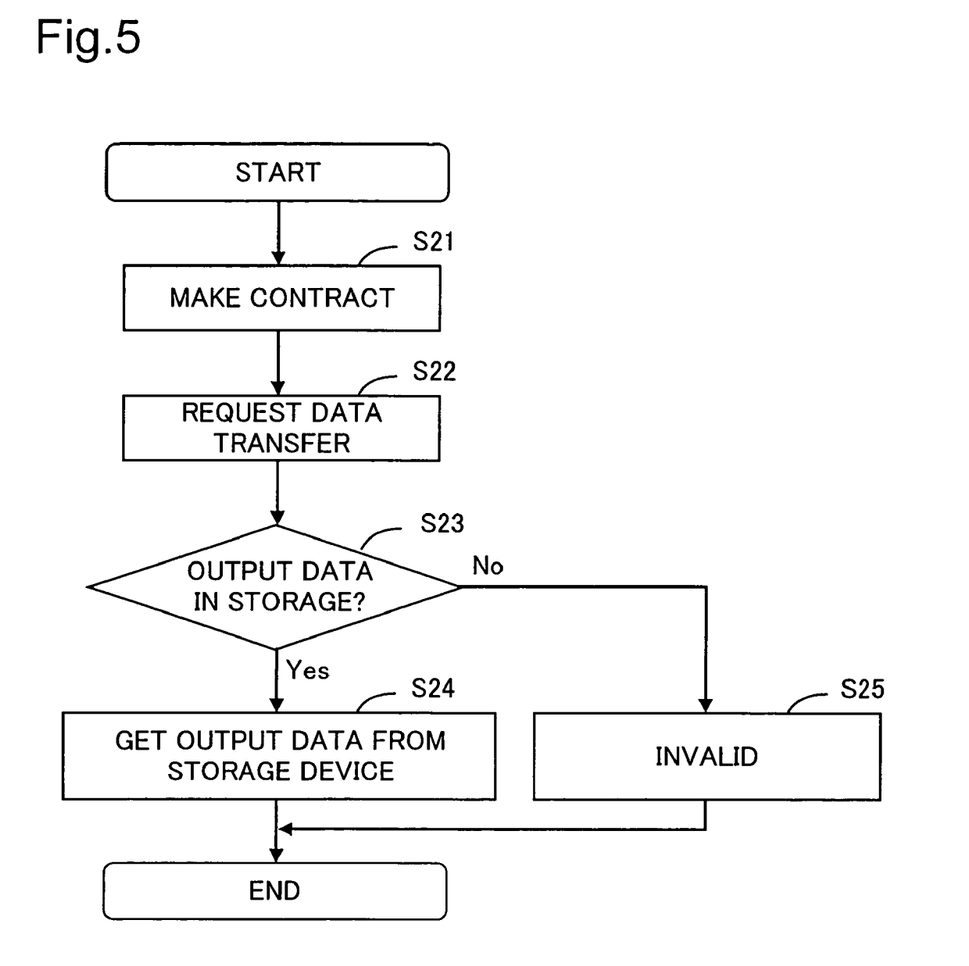
FIG. 5 is a flowchart showing the contract procedure.
Figure 6:
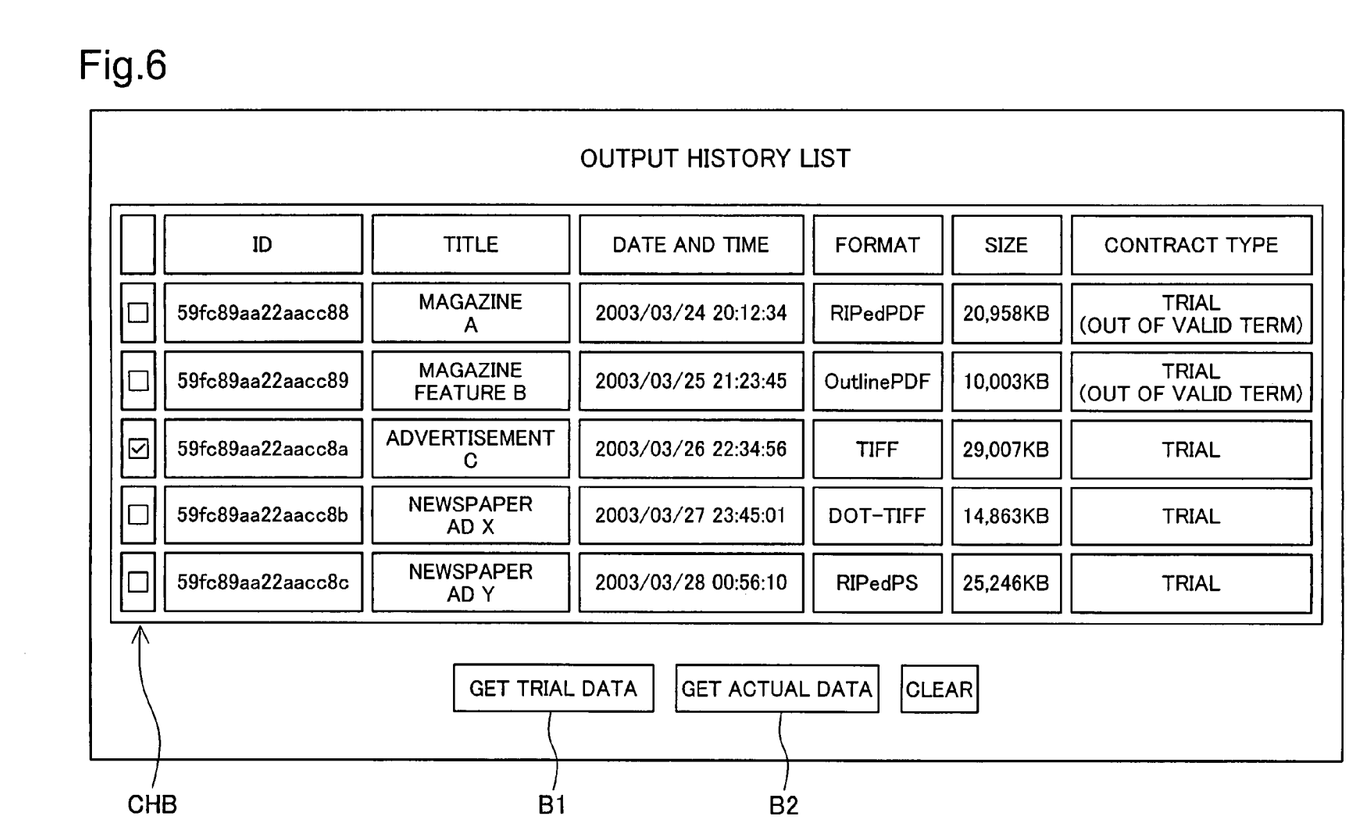
FIG. 6 illustrates a screen of output history list.

The non-contract user is allowed to make a contract on paid services via the network. FIG. 5 is a flowchart showing the contract procedure. Once the user accesses the Web server 110 from the client device 200 and applies for the paid operation contract, the user entry module 128 executes a process that is required for making the contract in step S21. Once the contract is made, the user is allowed to submit a request for image output data that are stored in the storage device 140 in step S22. FIG. 6 is a screen of output history list that is displayed on the client device 200 according to the information transferred from the Web server 110. The display screen includes IDs of operation jobs that were executed in the past, titles of the operation jobs, dates and times of completion of the jobs, formats of image output data, sizes of the image output data, and contract type. In this example, the contract type is in "trial" for every job.

The user can download trial image output data or paid image output data by checking a leftmost check box CHB and by pushing a get trial data button B1 or a get actual data button B2. It should be noted, however, that only the contract user can download actual data without undesired modification or the paid image output data.

As described above, the storage device 140 temporarily stores image output data without trial-job marks also for trial use before the contract is made on paid operations. Additionally, as shown in FIG. 6, each image output data is set to have a term of validity and is attached with an indication showing whether or not the data is within the term of validity. The indication of valid term information can take other forms such as an indication of a last day of the term of validity. When the user requests for transfer of data that is within the term of validity, the output data transfer module 126 reads the corresponding image output data from the storage device 140 and transfer the data to the client device 200 in step S23, S24. Data that is out of the term of validity is deleted from the storage module 140. When the user requests for transfer of data that is out of the term of validity, the client device 200 displays on its screen an indication that shows the data is not valid in step 25.

In this way, in the present embodiment, the user can execute charge-free trial operation jobs and check for their image qualities even before the contract is made on paid operations. After making the contract on paid operations, the user can execute paid operation jobs, and obtain image output data that were generated for trial operations, which allows for an effective use of operation results. The user can also obtain output operation results in shorter time. Since the paid operation jobs are executed in preference to the trial operation jobs in the embodiment described above, execution of the paid operation jobs is not delayed due to the trial operation jobs.

C. Modifications:

C1. Modification 1:

A variety of marks other than the characters "FOR EVALUATION" may also be used for the trial-job mark that is to be attached to the image obtained from the trial operation job. The trial-job mark is preferably provided onto the entire image in a uniform way.

C2. Modification 2:

In the embodiment described above, the paid operation jobs are set to have priority over the trial operation jobs all the time as long as any paid operation job remains in the paid operation queue Q1. Alternatively, the paid operation jobs may be set to have higher priority when a priority is assigned to a job or when the priorities are updated. Specifically, the trial operation jobs may be assigned with lower initial priorities than the paid operation jobs when the priority is assigned, and the paid operation jobs may have their priorities upgrading faster than those of the trial operation jobs when the priority of each job is upgraded as time goes on. Such a case also fulfills the condition that "the paid operation jobs registered in the paid operation queue have higher priorities over the trial operation jobs in the trial operation queue."

C3. Modification 3:

The trial operation jobs may also be imposed with restrictions that are severer than those imposed on the paid operation jobs in respect of data capacity and operation execution time. This will further reduce the possibility that execution of the paid operation jobs may be delayed due to the execution of the trial operation jobs.

C4. Modification 4:

The contract on paid operation service may take various forms such as a contract with limited term, a continuous contract with unlimited term, an individual contract on particular operation jobs, and the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of executing an output image generating operation job that is requested from a client device in an output operation execution system that is connected with the client device via a network, the method comprises the steps of:
   (a) providing within the output operation execution system a paid operation queue for registering orders of paid operation jobs and a trial operation queue for entering an order of charge-free trial operation jobs;
   (b) receiving from the client device a request for execution of either a paid operation job or a trial operation job;
   (c) entering the requested operation job into either the paid operation queue or the trial operation queue;
   (d) selecting an operation job to be executed while giving priority to the paid operation jobs into the paid operation queue over the trial operation jobs into the trial operation queue;
   (e) generating image output data by executing the selected operation job, and storing the image output data into a storage device of the output operation execution system;
   (f) if the executed operation job is a paid operation job, the output operation execution system transferring the image output data to the client device without undesired modification; and
   (g) if the executed operation job is a trial operation job, the output operation execution system adds to the image output data a trial-job mark indicating that the image output data has been made by trial operation, and transferring the image output data to the client device.

2. A method according to claim 1, further comprising the steps of:
   receiving an application for a paid operation service contract from a user who has requested a trial operation job and making the paid operation service contract;
   receiving from the client device that is used by the user who has the paid operation service a request for retransfer of the image output data that was executed and generated previously as the trial operation job; and
   in response to the request for retransfer, transferring the image output data that is stored in the storage device to the client device without adding the trial-job mark.

3. A method according to claim 2, further comprising the steps of:
   setting a term of validity for the image output data that is stored in the storage device;
   retaining the image output data in the storage device while the data is within the term of validity; and
   in response to the request from the user who is in use of the client device, transferring to the client device valid term information indicating whether or not the image output data of the operation job that was executed for the user is within the term of validity.

4. A method according to claim 1, further comprising the steps of
   setting a term of validity for the image output data that is stored in the storage device;
   retaining the image output data in the storage device while the data is within the term of validity; and
   in response to the request from the user who is in use of the client device, transferring to the client device valid term information indicating whether or not the image output data of the operation job that was executed for the user is within the term of validity.

5. A computer program product for use in an output operation execution system, the output operation execution system including a computer that is connected with a client device via a network, comprising:
   a computer readable medium; and
   a computer program stored on the computer readable medium, the computer program including:
   a first program for causing a computer to set a paid operation queue for registering orders of paid operation jobs and a trial operation queue for registering orders of charge-free trial operation jobs;
   a second program for causing the computer to receive from the client device a request for execution of either a paid operation job or a trial operation job and entering the requested operation job in either the paid operation queue or the trial operation queue;
   a third program for causing the computer to select an operation job to be executed while giving priority to the paid operation jobs in the paid operation queue over the trial operation jobs in the trial operation queue;
   a fourth program for causing the computer to generate image output data by executing the selected operation job, and to store the image output data into a storage device; and
   a fifth program for causing the computer to transfer the output image data to the client without undesired modification if the operation job executed in the operation execution module is a paid operation job, and to transfer the output image data to the client with a trial-job mark indicating that the image output data has been made by trial operation if the executed operation job is a trial operation job.

6. A computer program product according to claim 5, further comprising:

a sixth program for causing the computer to receive an application for a paid operation service contract from a user who has requested a trial operation job and makes the paid operation service contract, wherein upon receiving from the client device that is used by the user who has the paid operation service contract a request for retransfer of the image output data that was executed and generated previously as the trial operation job, the fifth program causes the computer to transfer the image output data that is stored in the storage device to the client device without adding the trial-job mark.

7. A computer program product according to claim 6, wherein the fifth program implements the functions of:

setting a term of validity for the image output data that is stored in the storage device, and retaining the image output data in the storage device while the data is within the term of validity; and in response to the request from the user who is in use of the client device, transferring to the client device valid term information indicating whether or not the image output data of the operation job that was executed for the user is within the term of validity.

8. A computer program product according to claim 5, wherein the fifth program implements the functions of:

setting a term of validity for the image output data that is stored in the storage device, and retaining the image output data in the storage device while the data is within the term of validity; and in response to the request from the user who is in use of the client device, transferring to the client device valid term information indicating whether or not the image output data of the operation job that was executed for the user is within the term of validity.

* * * * *